United States Patent
Lee et al.

(10) Patent No.: US 9,521,567 B2
(45) Date of Patent: Dec. 13, 2016

(54) METHOD FOR PERFORMING MEASUREMENT OF TERMINAL IN WIRELESS COMMUNICATION SYSTEM AND APPARATUS THEREFOR

(71) Applicant: LG ELECTRONICS INC., Seoul (KR)

(72) Inventors: Seungmin Lee, Anyang-si (KR); Hakseong Kim, Anyang-si (KR); Hanbyul Seo, Anyang-si (KR); Kijun Kim, Anyang-si (KR); Inkwon Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 54 days.

(21) Appl. No.: 14/412,557

(22) PCT Filed: Jul. 11, 2013

(86) PCT No.: PCT/KR2013/006202
§ 371 (c)(1),
(2) Date: Jan. 2, 2015

(87) PCT Pub. No.: WO2014/010963
PCT Pub. Date: Jan. 16, 2014

(65) Prior Publication Data
US 2015/0163687 A1 Jun. 11, 2015

Related U.S. Application Data

(60) Provisional application No. 61/670,592, filed on Jul. 11, 2012.

(51) Int. Cl.
*H04W 24/08* (2009.01)
*H04W 24/10* (2009.01)
(Continued)

(52) U.S. Cl.
CPC ............. *H04W 24/08* (2013.01); *H04L 5/005* (2013.01); *H04L 5/0007* (2013.01);
(Continued)

(58) Field of Classification Search
CPC ...... H04L 5/001; H04L 5/0053; H04L 5/0044; H04L 5/0048; H04L 5/0023; H04L 27/2613; H04L 5/0057; H04L 5/0073; H04W 48/12; H04W 24/08; H04W 24/00; H04W 72/1263; H04W 72/1257; H04W 72/1289; H04J 11/005
See application file for complete search history.

(56) References Cited

U.S. PATENT DOCUMENTS

2007/0066232 A1  3/2007 Black
2010/0309797 A1  12/2010 Lindoff et al.
(Continued)

FOREIGN PATENT DOCUMENTS

KR  10-2008-0060244 A  7/2008
KR  10-2011-0085827 A  7/2011
WO  WO 2008/025502 A1  3/2008

*Primary Examiner* — Jung-Jen Liu
(74) *Attorney, Agent, or Firm* — Birch, Stewart, Kolasch & Birch, LLP

(57) ABSTRACT

The present invention relates to a method for enabling a terminal to perform a measurement in a wireless communication system. More specifically, the present invention comprises the steps of: receiving information related to a specific cell group as a measuring target; determining a representative value by performing the measurement for the specific cell group according to the received information; and performing radio resource management or radio link monitoring on the basis of the representative value, wherein the specific cell group is configured to enable a virtual cell identifier to comprise a plurality of equally set cells.

13 Claims, 9 Drawing Sheets

(51) Int. Cl.
*H04L 5/00* (2006.01)
*H04W 88/02* (2009.01)

(52) U.S. Cl.
CPC .......... *H04L 5/0048* (2013.01); *H04L 5/0053* (2013.01); *H04W 24/10* (2013.01); *H04W 88/02* (2013.01)

(56) References Cited

U.S. PATENT DOCUMENTS

| | | |
|---|---|---|
| 2012/0040696 A1 | 2/2012 | Siomina et al. |
| 2012/0213108 A1* | 8/2012 | Ji ............................ H04B 7/024 370/252 |
| 2013/0003668 A1* | 1/2013 | Xiao ........................ H04L 5/001 370/329 |
| 2013/0003788 A1* | 1/2013 | Marinier ................ H04B 7/024 375/219 |
| 2013/0058233 A1 | 3/2013 | Kim |
| 2013/0235738 A1* | 9/2013 | Siomina ................ H04W 24/00 370/252 |
| 2013/0322413 A1* | 12/2013 | Pelletier ............ H04W 72/1289 370/336 |
| 2015/0171948 A1* | 6/2015 | Xiao ................... H04W 72/082 370/252 |

* cited by examiner

FIG. 2
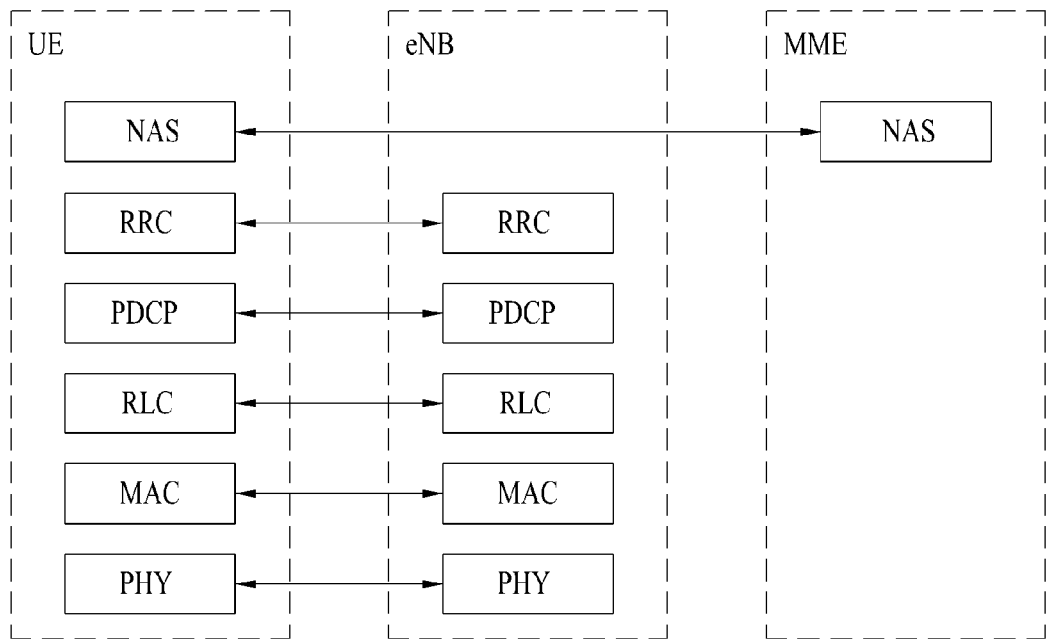
(a) CONTROL-PLANE PROTOCOL STACK
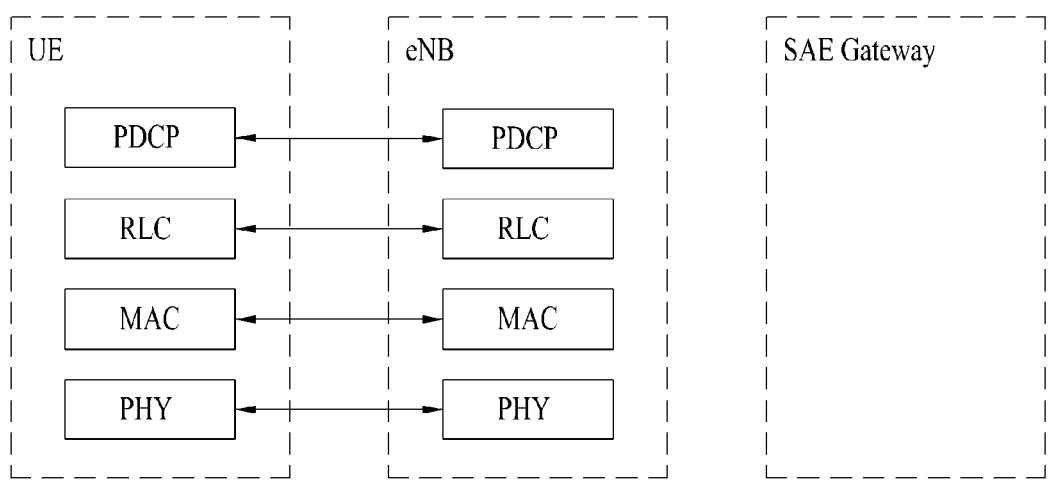
(b) USER-PLANE PROTOCOL STACK ⟵⟶ COMMUNICATION BETWEEN MACRO CELL AND UE
⟵--▶ COMMUNICATION BETWEEN MICRO CELL AND UE COMMON VIRTUAL CELL ID-BASED COOPERATIVE
COMMUNICATION (i.e. MICRO CELLS #A, #B, #C)

← → COMMUNICATION BETWEEN eNB AND UE BASED
ON COOPERATIVE COMMUNICATION

METHOD FOR PERFORMING MEASUREMENT OF TERMINAL IN WIRELESS COMMUNICATION SYSTEM AND APPARATUS THEREFOR

CROSS REFERENCE TO RELATED APPLICATIONS

This application is the National Phase of PCT International Application No. PCT/KR2013/006202, filed on Jul. 11, 2013, which claims priority under 35 U.S.C. 119(e) to U.S. Provisional Application No. 61/670,592, filed on Jul. 11, 2012, all of which are hereby expressly incorporated by reference into the present application.

TECHNICAL FIELD

The present invention relates to a wireless communication system, and more particularly, to a method and apparatus for performing a measurement by a User Equipment (UE) in a wireless communication system.

BACKGROUND ART

A 3rd generation partnership project long term evolution (3GPP LTE) (hereinafter, referred to as 'LTE') communication system which is an example of a wireless communication system to which the present invention can be applied will be described in brief FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the conventional problem is to provide a method and apparatus for performing a measurement by a User Equipment (UE) in a wireless communication system.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for performing a measurement by a User Equipment (UE) in a wireless communication system includes receiving information about a specific cell group to be measured, determining a representative value by measuring the specific cell group according to the received information, and performing Radio Resource Management (RRM) or Radio Link Monitoring (RLM) based on the representative value. The specific cell group includes a plurality of cells to which the same virtual cell Identifier (ID) is assigned.

The representative value may be determined according to communication state indication values measured from the plurality of cells. Each of the communication state indication values may be one of a Reference Signal Received Power (RSRP), a Reference Signal Received Quality (RSRQ), a Block Error Rate (BLER) of joint decoding of a Physical Downlink Control Channel (PDCCH) and a Physical Control Format Indicator Channel (PCFICH), an Enhanced PDCCH (EPDCCH)-based RLM measurement value, and a BLER based on decoding performance of an EPDCCH and a PDCCH.

The measuring may include performing a measurement using at least one Reference Signal (RS) transmitted at the same time point by the plurality of cells of the specific cell group.

The measuring may include performing a measurement based on an RS transmission resource area or an RS transmission antenna port, independently configured for each of the plurality of cells of the specific cell group.

The RLM may be set to be performed based on an EPDCCH.

The RRM may be set to be performed based on a measurement result of the specific cell group and a measurement result of a cell group having a cell ID different from the virtual cell ID.

If the measurement result of the specific cell group is larger than the measurement result of the cell group having a cell ID different from the virtual cell ID, the RRM may be set to be reported.

The method may further include attempting initial access based on an EPDCCH, or if the UE is in connected mode, the RRM may be performed for the plurality of cells to which the same virtual cell ID is assigned.

The RLM may be set to be performed based on at least one of an RLM measurement value of a serving BS of the UE and the representative value.

A Timing Advance (TA) value may be set for the UE with respect to a specific cell included in the specific cell group In another aspect of the present invention, a UE for performing a measurement in a wireless communication system includes a Radio Frequency (RF) unit, and a processor. The processor is configured to receive information about a specific cell group to be measured, to determine a representative value by measuring the specific cell group according to the received information, and to perform RRM or RLM based on the representative value. The specific cell group includes a plurality of cells to which the same virtual cell ID is assigned.

Advantageous Effects

According to the embodiments of the present invention, a User Equipment (UE) can perform a measurement efficiently for Radio Link Monitoring (RLM) or Radio Resource Management (RRM) in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN);

BEST MODE FOR CARRYING OUT THE INVENTION

Figure 1:
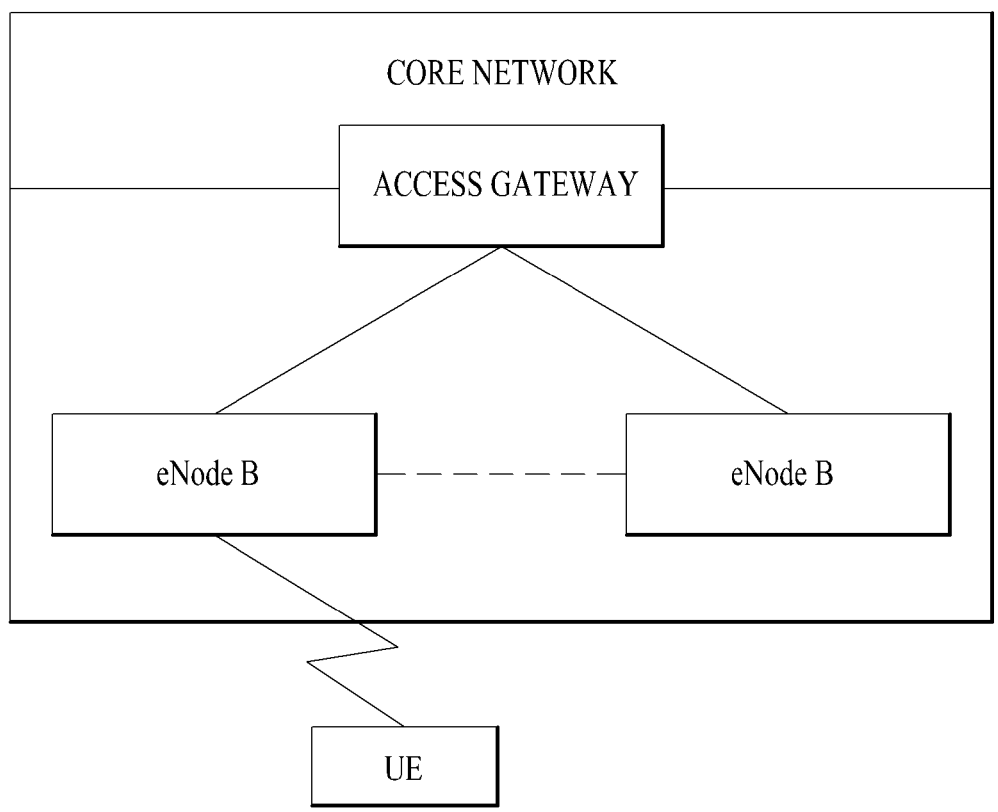
FIG. 1 illustrates a configuration of an Evolved Universal Mobile Telecommunications System (E-UMTS) network as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3 GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
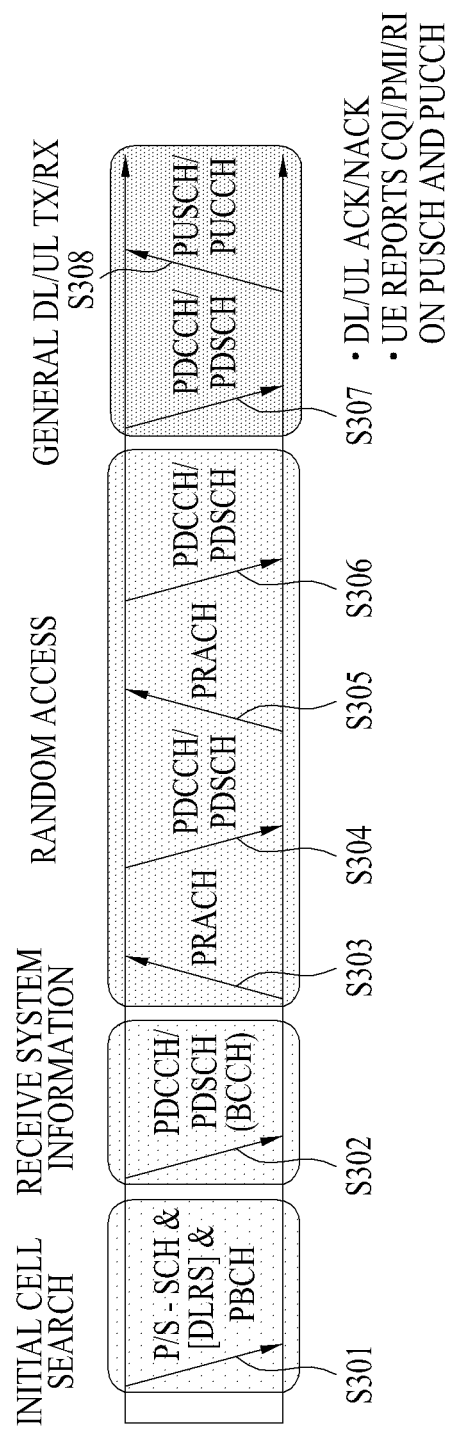
FIG. 3 illustrates physical channels and a general signal transmission method using the physical channels in a 3GPP Longer Term Evolution (LTE) system.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
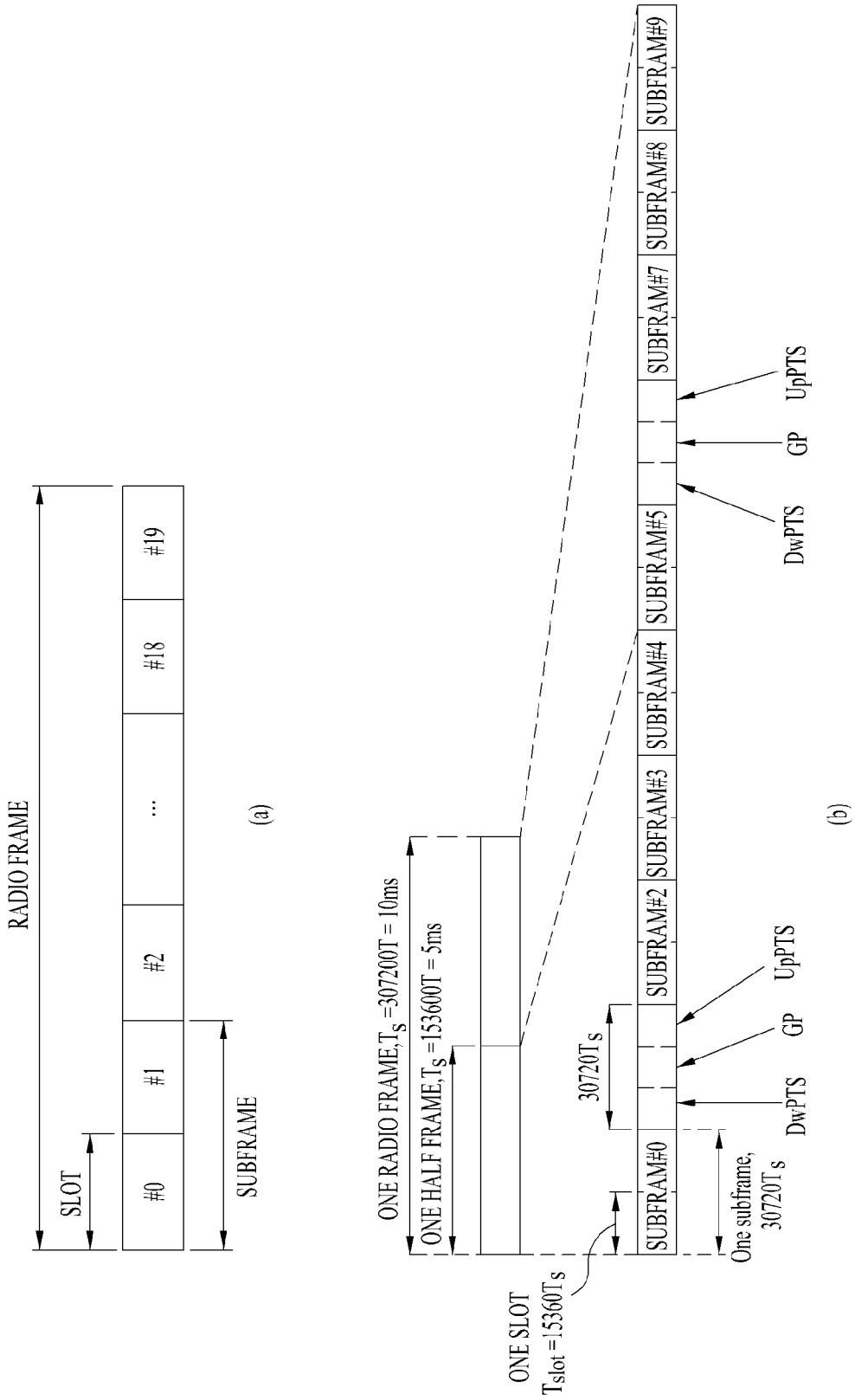
FIG. 4 illustrates a radio frame structure in the LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
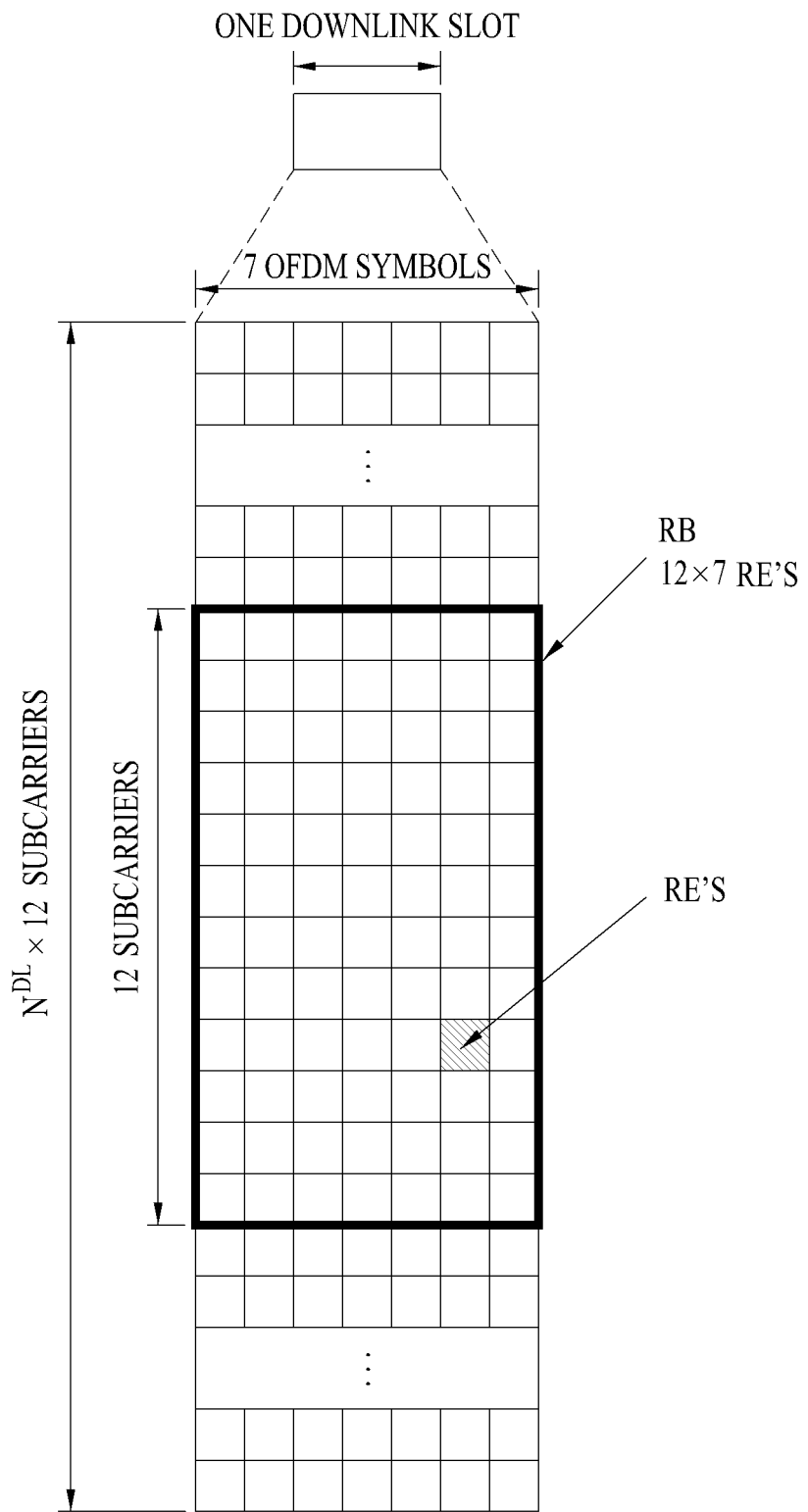
FIG. 5 illustrates a structure of a Downlink (DL) resource grid for the duration of one DL slot.

FIG. 5 is a diagram illustrating a resource grid of a downlink slot.

Referring to FIG. 5, the downlink slot includes a plurality of $N_{symb}^{DL}$ OFDM symbols in a time domain and a plurality of $N_{RB}^{DL}$ resource blocks in a frequency domain. Since each resource block includes $N_{sc}^{RB}$ subcarriers, the downlink slot includes $N_{RB}^{DL} \times N_{sc}^{RB}$ subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes $N_{symb}^{DL} \times N_{sc}^{RB}$ number of resource elements. The

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — | number $N_{RB}^{DL}$ of resource blocks included in the downlink slot depends on a downlink transmission bandwidth configured in the cell.

Figure 6:
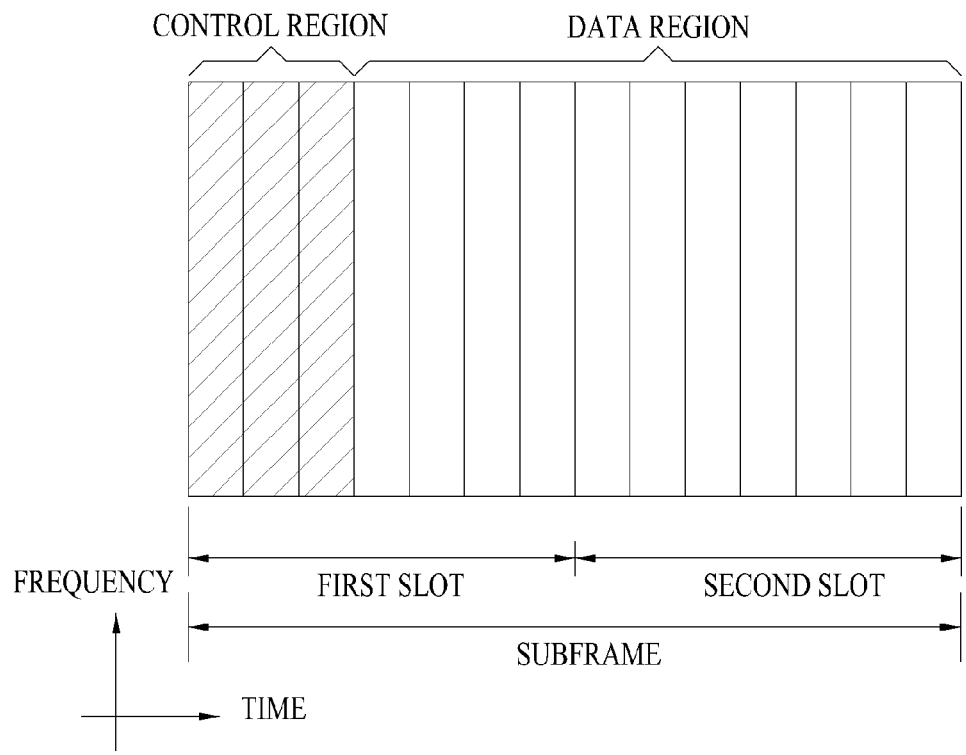
FIG. 6 illustrates a structure of a DL radio frame in the LTE system.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
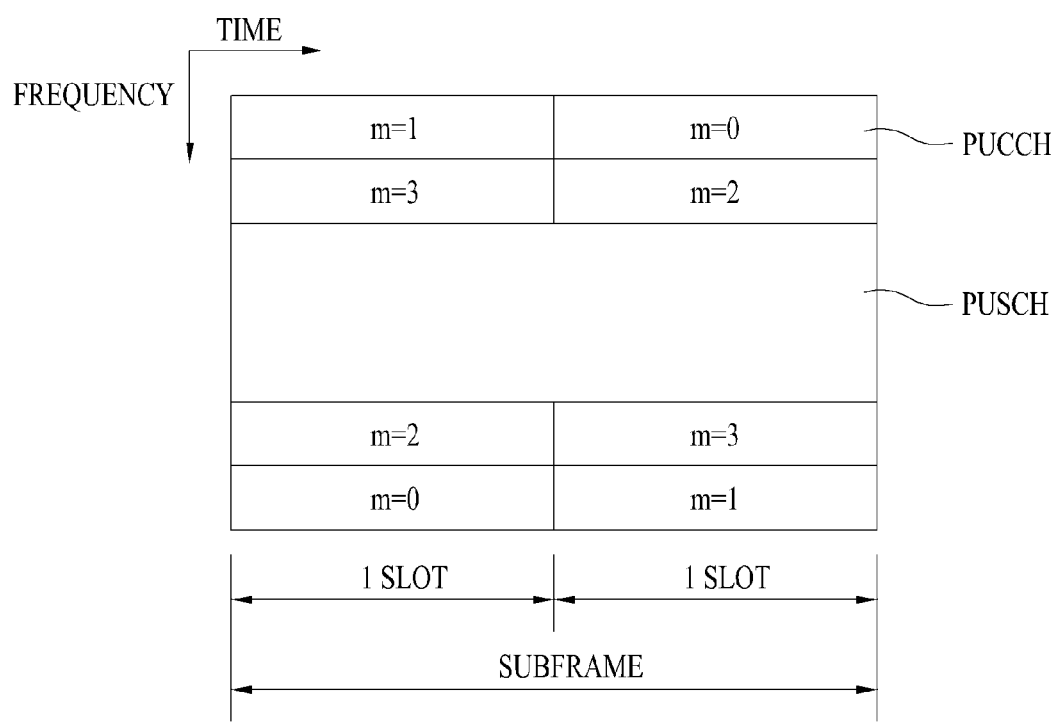
FIG. 7 illustrates a structure of an Uplink (UL) subframe in the LTE system.

FIG. 7 illustrates an exemplary UL subframe in the LTE system.

Referring to FIG. 7, a UL subframe includes a plurality of (e.g., 2) slots. Each slot may include a different number of SC-FDMA symbols according to a CP length. The UL subframe is divided into a data region and a control region in the frequency domain. The data region includes a PUSCH and is used to transmit a data signal such as voice, etc. The control region includes a PUCCH and is used to transmit Uplink Control Information (UCI). The PUCCH includes an RB pair at both ends of the data region in the frequency domain and hops over a slot boundary.

The PUCCH may deliver the following control information.

Scheduling Request (SR): information used to request UL-SCH resources. An SR is transmitted in On-Off Keying (OOK).

HARQ ACK/NACK: a response signal to a DL data packet transmitted on a PDSCH. An HARQ ACK/NACK indicates whether a DL data packet has been received successfully. A 1-bit ACK/NACK is transmitted in response to a single DL codeword, and a 2-bit ACK/NACK is transmitted in response to two DL codewords.

Channel State Information (CSI): feedback information about a DL channel. CSI includes a Channel Quality Indicator (CQI). Further, the CSI includes a Rank Indicator (RI), a Precoding Matrix Indicator (PMI), a Precoding Type Indicator (PTI), etc. as Multiple Input Multiple Output (MIMO)-related feedback information. The CSI occupies 20 bits per subframe.

The amount of UCI that a UE may transmit in a subframe depends on the number of SC-FDMA symbols available for transmission of the UCI. The SC-FDMA symbols available for transmission of the UCI are the remaining SC-FDMA symbols except for SC-FDMA symbols used for RS transmission in a subframe. If the subframe carries a Sounding Reference Signal (SRS), the last SC-FDMA symbol of the subframe is not available for transmission of the UCI. The RS is used for coherent detection of a PUCCH.

It is expected that a system compliant with the future-generation mobile communication standard, LTE-A will support Coordinated Multi-Point (CoMP) transmission which is not supported by the legacy standard, in order to increase data transmission rates. The CoMP transmission refers to a transmission scheme in which two or more eNBs or cells communicate with a UE located in a shadowing area through cooperation to increase communication performance between the UE and an eNB (cell or sector).

CoMP transmission schemes may be classified into CoMP-Joint Processing (CoMP-JP) based on cooperative MIMO through data sharing and CoMP-Coordinated Scheduling/Beamforming (CoMP-CS/CB).

On DL, a UE may receive data from eNBs that perform CoMP transmission instantly at the same time and combine the received data, to thereby increase reception performance in CoMP-JP (Joint Transmission (JT)). In addition, a method for transmitting data to the UE at a specific time point by one of the eNBs that perform the CoMP transmission may be considered (Dynamic Point Selection (DPS)). On the other hand, the UE may receive data instantly from one eNB, that is, a serving eNB by beamforming in CoMP-CS/CB.

On UL, eNBs may receive a PUSCH signal simultaneously from a UE in CoMP-JP (Joint Reception (JR)). In CoMP-CS/CB, only one eNB receives a PUSCH and cooperative cells (or eNBs) determine whether to use CoMP-CS/CB.

CoMP is applicable to a heterogeneous network as well as a homogeneous network including only macro eNBs.

Figure 8:
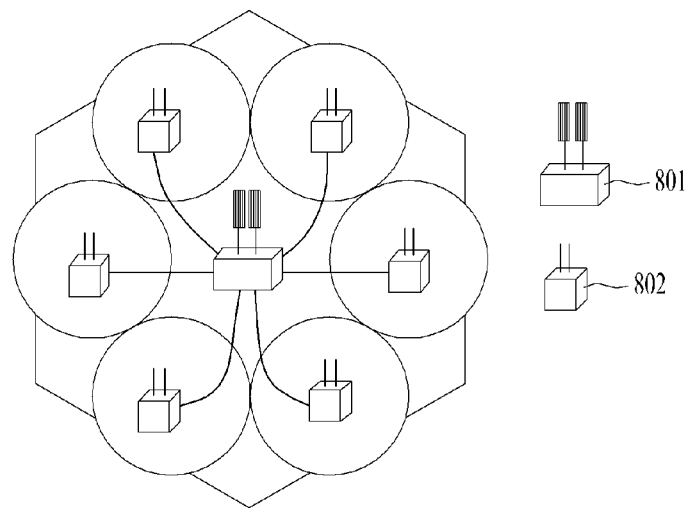
FIG. 8 illustrates an exemplary configuration of a heterogeneous network to which a Coordinated Multi-Point (CoMP) scheme is applicable.

FIG. 8 illustrates an exemplary configuration of a heterogeneous network to which a CoMP scheme is applicable. Particularly, FIG. 8 illustrates a network including a macro eNB 801 and Radio Remote Heads (RRHs) 802 that transmit and receive signals with relatively low transmission power. A pico eNB or an RRH located within the coverage of a macro eNB may be connected to the macro eNB by an optical cable or the like. An RRH may be referred to as a micro eNB.

Referring to FIG. 8, it is noted that because the transmission power of a micro eNB such as an RRH is lower than the transmission power of a macro eNB, the coverage of each RRH is small relative to the coverage of the macro eNB.

It is expected in such a CoMP scenario to cover a coverage hole of a specific area through added RRHs or increase overall system throughput through cooperative transmission using a plurality of Transmission Points (TPs) including an RRH and a macro eNB, compared to a legacy system including macro eNBs only.

In FIG. 8, the RRHs may be considered in two cases. One of the two cases is that different cell IDs from the cell ID of the macro eNB are allocated to the RRHs, and the other case is that the same cell ID as that of the macro eNB is allocated to the RRHs.

If a different cell ID from the cell ID of the macro eNB is allocated to each RRH, the RRH is perceived as an independent cell to a UE. A UE at a cell edge experiences severe interference from a neighbor cell. To mitigate interference and increase a transmission rate, various CoMP schemes have been proposed.

If the same cell ID as that of the macro eNB is allocated to each RRH, the RRH and the macro eNB are perceived as a single cell to a UE, as described before. The UE receives data from the RRH and the macro eNB. In the case of a data channel, precoding used for data transmission is also applied to an RS for each UE. Therefore, the UE may estimate its actual channel carrying data using the RS. The RS to which precoding is applied is the afore-described DM-RS.

As described before, a legacy LTE UE performs channel estimation only based on CRS and thus performs both data demodulation and CSI feedback according to the channel estimation. In addition, the UE performs cell tracking, frequency offset compensation, synchronization, and Radio Resource Management (RRM) measurement such as Received Signal Strength Indicator (RSSI)/Reference Signal Received Power (RSRP), using the CRS-based channel estimation.

In contrast, an LTE-A UE performs channel estimation and data demodulation using DM-RS and CSI feedback using CSI-RS, instead of CRS. The other functions are still performed using CRS.

Figure 9:
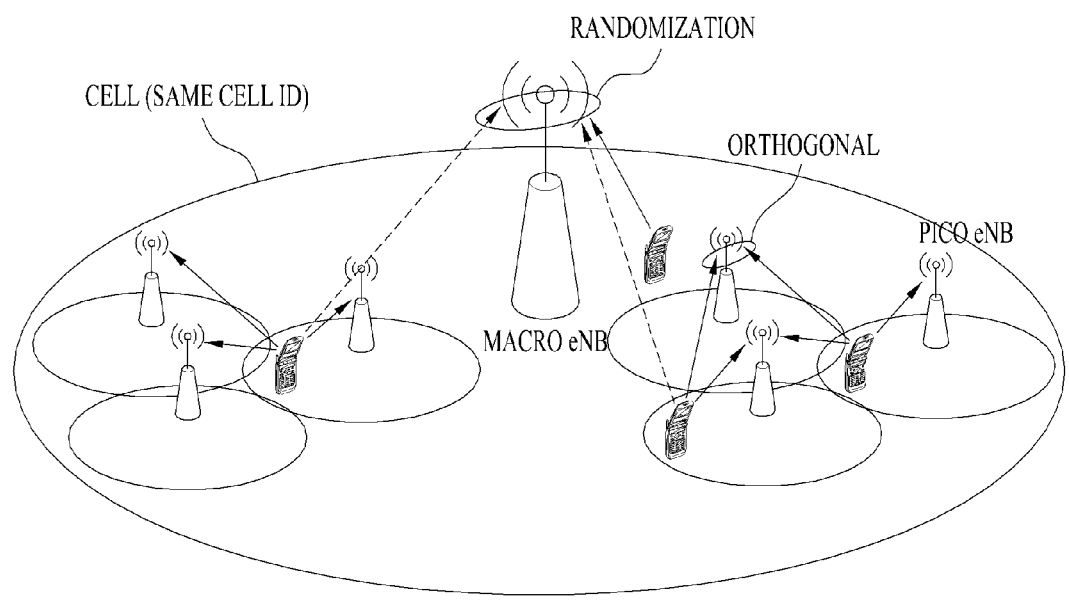
FIG. 9 illustrates CoMP scenario 4.

FIG. 9 is a view referred to for describing CoMP scenario 4.

Referring to FIG. 9, a macro eNB provides macro cell coverage. A plurality of pico eNBs are located within the macro cell coverage. The macro eNB and the pico eNBs have the same cell ID. UEs may be classified into a CoMP UE that performs CoMP transmission and a non-CoMP UE that does not perform CoMP transmission. The CoMP UE may receive signals from a plurality of eNBs by DL CoMP and may transmit signals to the eNBs by UL CoMP. FIG. 9 illustrates an exemplary case of UL CoMP transmission, in which a UE transmits a signal to a plurality of eNBs. An eNB receives signals from a plurality of UEs. Signals that the macro eNB receives from a plurality of UEs may be randomized. Orthogonality may be maintained between UL RSs transmitted in the same bandwidth at the same frequency position by different cyclic shifts.

Figure 10:
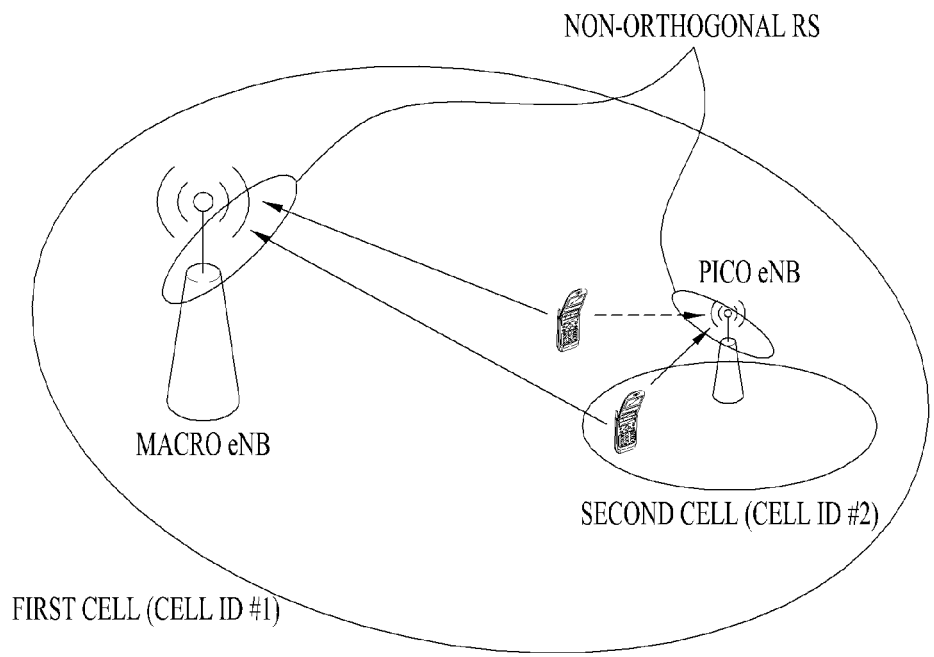
FIG. 10 illustrates CoMP scenario 3.

FIG. 10 is a view referred to for describing CoMP scenario 3.

Referring to FIG. 10, CoMP scenario 3 may be a heterogeneous network in which a macro eNB and a pico eNB have different cell IDs. In FIG. 10, the macro eNB has cell ID #1 and at least one pico eNB is located within the macro cell coverage of the macro eNB. The pico eNB has cell ID #2. That is, the macro eNB and the pico eNB have different cell IDs. In CoMP scenario 3, a CoMP UE may perform CoMP transmission to the macro eNB and the pico eNB. FIG. 10 illustrates an exemplary case of UL CoMP transmission, in which a UE transmits a signal to a macro eNB and a pico eNB.

In CoMP scenario 3 illustrated in FIG. 10, even though a plurality of UEs transmit UL RSs with overlap in different bandwidths, the UEs generate UL RS sequences using different cell IDs and thus the UL RS sequences are not highly correlated. In other words, the UL RSs transmitted by the UEs are not mutually orthogonal. However, if a CoMP UE performs UL CoMP transmission, a performance gain may be increased by orthogonality between UL RSs of cells.

Hereinbelow, an embodiment of the present invention provides a method for performing an efficient Radio Link Monitoring (RLM) or RRM operation at a UE in an environment in which a plurality of eNBs having relatively small communication coverage (e.g., micro cells) are deployed within the area of an eNB having large communication coverage (e.g., a macro cell).

The embodiment of the present invention can be extended to any situation (e.g., CoMP) in which communication is conducted through cooperation between cells (e.g., cooperation between macro cells, cooperation between micro cells, or cooperation between heterogeneous cells).

In addition, the proposed method of the present invention can be extended to a case in which an eNB having large communication coverage and a plurality of eNBs having small communication coverage perform communication in the same system band (or the same frequency resource area) or adjacent system bands (or adjacent frequency resource areas).

For the convenience of description of the proposed method, an eNB having large communication coverage is defined as a "macro cell" and an eNB having relatively small communication coverage is defined as a "micro cell".

In the present invention, a micro cell is considered to be an eNB (or Transmission Point (TP)/Reception Point (RP)) having lower transmission power than a macro cell. Nonetheless, the proposed method can be extended to a case in which a micro cell has similar transmission power (or communication coverage) to that of a macro cell or a UE performs an RLM/RRM operation based on a preset RS (e.g., CSI-RS or DM-RS), not CRS.

In addition, the proposed method of the present invention can be extended to a case in which a UE communicates with a specific eNB on an Enhanced PDCCH (EPDCCH, transmitted in a PDSCH region), not on a legacy PDCCH.

Figure 11:
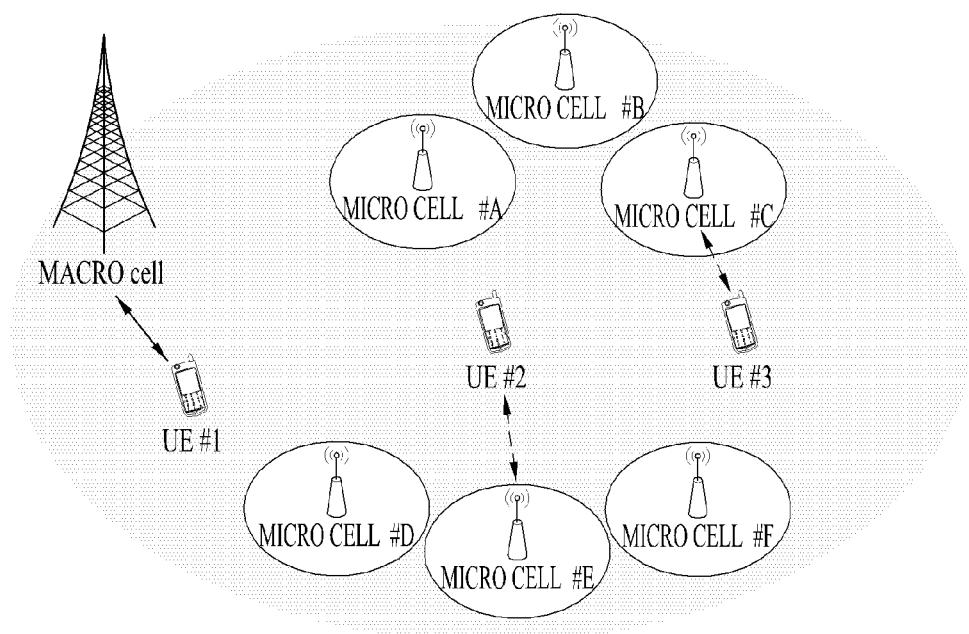
FIG. 11 illustrates a case in which a plurality of micro cells are located within the communication coverage of a specific macro cell.

FIG. 11 illustrates a case in which a plurality of micro cells are located within the communication coverage of a specific macro cell. It is assumed that the macro cell and the micro cells communicate in the same system band or the same frequency resource area. It is also assumed that the macro cell and the micro cells have physical cell IDs which may be distinguished from one another.

In addition, it is assumed that a UE compares reception strengths (e.g., Reference Signal Received Powers (RSRPs)

or Reference Signal Received Qualities (RSRQs)) of preset RSs (e.g., CRSs) received from eNBs and communicates with an eNB having the largest reception strength based on the comparison. For example, it is assumed that UE #1 is communicating with a macro cell, UE #2 is communicating with micro cell #E, and UE #3 is communicating with micro cell #C in FIG. 11.

For example, if a plurality of micro cells having relatively small communication coverage are deployed within the area of a macro cell having large communication coverage as illustrated in FIG. 11, as different physical cell IDs as possible may be configured for the micro cells in order to achieve a cell split gain of a legacy UE (e.g., a Rel-8/9 UE, hereinafter, referred to as an "L-UE").

In an embodiment of a method for allocating physical cell IDs to micro cells, a specific micro cell may be allocated a physical cell ID different from that of another cell (e.g., a macro cell or a micro cell).

Or physical cell IDs may be allocated to micro cells in a preset rule. For example, lack of physical cell IDs may be overcome by allocating a different cell ID from that of a macro cell to a specific micro cell and allocating the same physical cell ID to micro cells relatively remote from each other, taking into account spatial distances between micro cells. In another example, the same physical cell ID may be allocated to a macro cell and micro cells at the moment of network deployment and then a virtual cell ID different from the physical cell ID may be allocated to specific micro cells, for performing efficient cooperative communication or achieving a cell split gain.

On the other hand, if physical cell IDs are allocated to micro cells as independently (or differently) as possible to achieve a cell split gain of an L-UE in the environment illustrated in FIG. 11, the L-UE or another UE (e.g., Rel-10/11 UE, hereinafter referred to as an "A-UE") may face a problem due to a change in the UE's location or a change in the channel state between a serving eNB and the UE. Specifically, as the location of the L-UE or the A-UE is changed, the L-UE or the A-UE may perform frequent handover operations, RRM reporting operations, or Radio Link Failure (RLF) declarations for RLM.

This problem occurs because as a plurality of micro cells having small communication coverage (relative to the communication coverage of a macro cell) are distributed in a network, even a slight change in the location of a specific UE or a change in the channel state between a serving eNB and the specific UE increases the probability of existence of other eNBs having better channel states (or higher RSRP/RSRQ measurements) than the serving eNB with which the UE is communicating. Due to the existence of the eNBs having better channel states, the specific UE performs frequent RRM reporting operations or handover operations with the serving eNB. Moreover, the frequent RRM reporting operations or handover operations of the UE may increase signal overhead and keep communication unstable.

If a specific UE is communicating with a micro cell having relatively small communication coverage in the environment illustrated in FIG. 11, the channel state between the micro cell and the specific UE is highly probable to get poor in a relatively short time due to a slight change in the location of the UE. When the channel state between the UE and its serving eNB is changed (e.g., short-term fading (fast fading) or long-term fading (shadow fading)) or other neighbor eNBs (e.g., micro cells or macro cells) interfere, the channel state between the micro cell and the specific UE is also highly probable to get poor in a relatively short time. As a result, the specific UE frequently declares RLF and re-establishes or re-selects a cell.

For example, if the performance of joint decoding of a (CRS-based) PDCCH and PCFICH does not satisfy a Block Error Rate (BLER) of 10% continuously for a predetermined time period or a predetermined number of times, the UE may declare RLF. If a newly defined EPDCCH-based RLM measurement (e.g., the performance of joint decoding of a DM-RS-based EPDCCH and E-PCFICH) or combined decoding performance of an EPDCCH and a PDCCH does not satisfy a specific criterion for a predetermined time period, instead of the performance of joint decoding of a (CRS-based) PDCCH and PCFICH, the UE may also declare RLF. After the RLF declaration, the UE performs cell reselection based on an RSRP/RSRQ measurement value.

Frequent RLF declarations of the UE may cause maintenance of unstable communication or additional cell reselection (or an additional initial access procedure).

Figure 12:
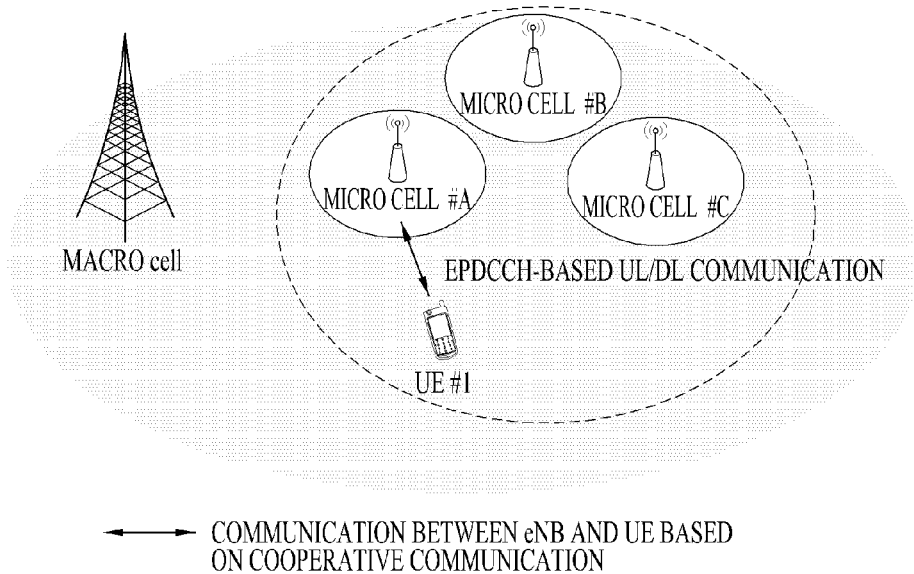
FIG. 12 illustrates a case in which a plurality of evolved Node Bs (eNBs) perform cooperative communication based on a common virtual cell Identifier (ID)

FIG. 12 illustrates an embodiment of cooperative communication of a plurality of eNBs based on a common virtual cell ID.

When a UE performs UL/DL communication with a specific eNB (or RP/TP), the UE may communicate with the eNB using control/data information transmitted based on a predefined parameter (e.g., a virtual cell ID), instead of a physical cell ID of the eNB.

For example, the UL/DL communication may be performed between the UE and the eNB based on a preset virtual cell ID of the eNB, and EPDCCH transmission and reception or UL/DL data transmission and reception based on the virtual cell ID. Particularly, the EPDCCH transmission and reception or the EPDCCH-based UL/DL data transmission and reception may be performed using DM-RS based on the virtual cell ID assigned to the eNB.

In this case, if a plurality of eNBs perform cooperative communication (e.g., DPS) based on a common virtual cell ID, a specific UE needs to determine the physical cell ID of an eNB that transmits control information related to UL/DL communication (e.g., a virtual cell ID-based EPDCCH) in a predefined resource area (e.g., a search space).

That is, the UE may perform a virtual cell ID-based UL/DL control/data information transmission and reception without knowledge of the physical cell ID of the eNB that actually transmits the UL/DL control/data information (i.e. a transparent operation).

Referring to FIG. 12, it is assumed that UE #1 is transmitting and receiving EPDCCH-based UL/DL control/data information to and from micro cell #A among eNBs (i.e., micro cells #A, #B, and #C) participating in cooperative communication based on a common virtual cell ID. In this case, the UE may communicate with micro cell #A to and from which the UE transmits and receives UL/DL control/data information, without knowledge of the physical cell ID of micro cell #A (i.e., a transparent operation).

Accordingly, the present invention provides a method for supporting both a cell split gain (e.g., an L-UE and an A-UE) and an efficient RLM/RRM operation of a UE (e.g., an A-UE) in an environment in which a plurality of eNBs having relatively small communication coverage (e.g., micro cells) are deployed in the area of an eNB having large communication coverage (e.g., a macro cell).

As a plurality of eNBs having distinguishable physical cell IDs are distributed in a network, UEs (e.g., an L-UE and an A-UE) may achieve a cell split gain and a UE (e.g., an A-UE) may conduct communication efficiently by avoiding frequent handover operations or RRM reporting operations (or RLF declarations of RLM) in the present invention.

For the convenience of description, it is assumed that a specific micro cell is allocated a physical cell ID different from the physical cell ID of another cell (e.g., a macro cell or a micro cell). However, the embodiments of the present invention can be extended to a case in which physical cell IDs are allocated to micro cells in a preset rule. For example, the embodiments of the present invention are applicable to a case in which a different cell ID from that of a macro cell is allocated to a specific micro cell and the same physical cell ID is allocated to micro cells relatively remote from each other, taking into account spatial distances between micro cells, or a case in which the same physical cell ID is allocated to a macro cell and micro cells at the moment of network deployment and then a virtual cell ID different from the physical cell ID may be allocated to specific micro cells, for performing efficient cooperative communication or achieving a cell split gain.

While it is assumed that EPDCCH-based UL/DL communication is conducted using a virtual cell ID in the embodiments of the present invention as set forth below, the embodiments of the present invention can be extended to a case in which control information (e.g., a PDCCH or EPDCCH) is transmitted based on a physical cell ID from a preset serving eNB and data information (e.g., a PDSCH) is transmitted using a virtual cell ID-based DM-RS from a specific eNB selected according to the channel state between the eNB and a UE.

Figure 13:
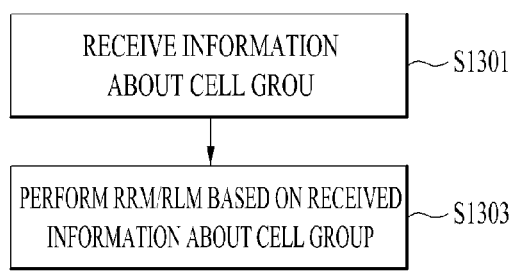
FIG. 13 is a flowchart illustrating a measurement method according to an embodiment of the present invention.

FIG. 13 is a flowchart illustrating a measurement method according to an embodiment of the present invention.

In FIG. 13, it is assumed that a plurality of eNBs having relatively small communication coverage (e.g., micro cells) are deployed in the area of an eNB having large communication coverage (e.g., a macro cell).

A UE may be configured to perform an RRM/RLM operation (or UL/DL control/data communication) based on a "cell group" including a plurality of eNBs (e.g., a group of a macro cell and a micro cell or a group of micro cells) or based on a "virtual cell ID assigned to the cell group". The RRM operation includes RRM reporting or handover based on an RSRP (or RSRQ) measurement, and the RLM operation includes RLF declaration and cell reselection of a UE according to a change in the channel state between an eNB and the UE.

A UE may receive information about a specific cell group from an eNB (S1301). For example, a configuration for a list of a plurality of eNBs included in the specific cell group, a virtual cell ID configuration for the cell group, a virtual cell ID configuration for each eNB, or a virtual cell ID configuration for forming a cell group may be predefined (e.g., at a time point of deploying a network including a macro cell and a micro cell). The UE may receive the information about the cell group from the eNB by a system information signal (e.g., System Information Block (SIB) or Master Information Block (MIB)), a higher layer signal, or a physical layer signal.

In another example, eNBs may be configured and selected as members of the specific cell group by performing a preset rule-based operation.

In an embodiment of performing a preset rule-based operation, a specific eNB may determine whether it is appropriate for a neighbor eNB to join in the same cell group as the specific eNB based on the strength of interference or the reception strength of a predefined RS from the neighbor eNB. For example, if the strength of interference or the reception strength of an RS from the neighbor eNB is larger than a threshold, the specific eNB may transmit a same cell group configuration (request) signal to the neighbor eNB on a predetermined radio channel or via an X2 interface.

Finally, a plurality of cell groups may be formed in the network by exchange of cell group configuration signals (or negotiations). Information about the final cell groups or virtual cell ID configurations used for the cell grouping may be shared between eNBs on predetermined radio channels or via X2 interfaces. While the above example has been described in the context of information about cell groups formed by a cell group configuration signal exchange operation, the example is also applicable to a case in which information about an existing cell group is changed or updated.

An operation for configuring a virtual cell ID for a specific cell group may be performed along with or similarly to an operation for configuring the specific cell group. An eNB may indicate to a UE information about a virtual cell ID configuration for cell groups or a specific cell group, a virtual cell ID configuration for each eNB, or virtual cell ID configurations for configuring cell groups by a system information signal (e.g., an SIB or an MIB), a higher layer signal, or a physical layer signal.

For example, the eNB may transmit to the UE a list of the physical cell IDs of cells included in a specific cell group or both the list and information about a virtual cell ID for the cell group, as information about the specific cell group.

If the UE receives the cell group information or information about a virtual cell ID assigned to the specific cell group from the eNB according to the above embodiment, the UE may be configured to perform a (new) virtual cell ID-based RRM/RLM operation in the specific cell group for which a common virtual cell ID is assumed (S1303).

For example, if a plurality of micro cells having relatively small communication coverage are deployed in the area of a macro cell having large communication coverage as illustrated in FIG. 11, UEs perform frequent RRM reporting operations, handover operations, or RLF declarations of RLM, even when the locations of the UEs or the channel states between a serving eNB and the UEs are slightly changed.

Accordingly, a UE may consider a cell group to which its serving cell belongs to be a single cell or a single virtual cell ID-based cell in an embodiment of the present invention. Therefore, the UE may be configured to perform an RRM/RLM operation based on a representative value which is a combination of communication/channel state indication values measured from a plurality of eNBs included in the cell group. For example, a communication/channel state indication value may be at least one of an RSRP/RSRQ value, a BLER of joint decoding of a PDCCH and a PCFICH, a BLER of a newly defined EPDCCH-based RLM measurement value (e.g., a BLER of joint decoding of an EPDCCH and an EPCFICH), or a BLER of combined decoding performance of an EPDCCH and a PDCCH and the UE may perform an RRM/RLM operation according to the representative value of the communication/channel state indication values.

Further, a representative value indicating the communication/channel state of a specific cell group for an RRM/RLM operation of a UE (e.g., RRM reporting, handover, or RLF declaration of RLM of the UE) may be predefined from (physical cell ID-based) communication/channel state indication values measured from a plurality of eNBs included in the cell group. For example, the representative value may be defined as the maximum or minimum value of the communication/channel state indication values. For example, a communication/channel state indication value may be at least one of a harmonic mean, an arithmetic mean, or a weighted mean, or may be predefined as a value calculated by a predefined function.

Although a UE may derive a representative value indicating a communication/channel state of a specific cell group according to the present invention after measuring communication/channel states of individual eNBs included in the specific cell group using predetermined RSs (e.g., CRSs or CSI-RSs) received from the eNBs, the eNBs of the specific cell group may transmit a new RS to UEs through cooperation between the eNBs, for use in calculating a representative value indicating the communication/channel state of the cell group.

The new RS according to the present invention may be defined as a combination of RSs (e.g., CSI-RSs or CRSs) transmitted at the same time by the eNBs included in the specific cell group. Different or independent distinguishable configurations for transmission of an RS used in calculating a representative value indicating a communication/channel state may be defined for the respective eNBs. Apparently, the new RS may be defined as a combination of RSs transmitted at independent time points by the eNBs of the specific cell group.

Further, the serving eNB may indicate configuration information about the new RS to the UE by a higher layer signal (a physical layer signal or system information), so that the UE may calculate a representative value indicating the communication/channel state of the specific cell group.

Therefore, if the new RS is used to calculate a representative value indicating the communication/channel state of a specific cell group, the UE may perform an RRM/RLM operation using the representative value (e.g., an average SINR) indicating the communication/channel state of the specific cell group, measured based on the new RS.

Further, after a representative value (e.g., an RSRP value or an average SINR) indicating the average communication/channel state of the specific cell group is measured using the new RS, for an RLM operation of the UE, the measured representative value may be converted into a representative value for the RLM operation (e.g., RLF decision) by a predefined rule or conversion function.

In another embodiment of the present invention, it may be regulated that unlike an L-UE, an A-UE performs a newly defined RLM operation instead of a legacy RLM operation.

For example, compared to an L-UE that declares RLF if the joint decoding performance of a (CRS-based) PDCCH and PCFICH does not satisfy a BLER of 10% for a predetermined time period or a predetermined number of times, the new RLM operation that the A-UE performs may be defined based on an EPDCCH. That is, the A-UE may perform an RLM operation based on the joint decoding performance of a (DM-RS-based) EPDCCH and EPCFICH or combined decoding performance of an E-PDCCH and a PDCCH.

Further, the A-UE may be configured to monitor only a (DM-RS-based) EPDCCH, not a legacy (CRS-based) PDCCH. Exceptionally, fallback to the legacy PDCCH may be allowed for the A-UE.

In addition, a UE may measure a communication/channel state (e.g., an RSRP/RSRQ) for each eNB based on a physical cell ID in the same manner as done conventionally (e.g., like an L-UE) and determine whether to perform RRM reporting to a serving eNB using a representative communication/channel state value of a specific cell group.

For example, the UE may compare a representative communication/channel state value of a specific cell group currently communicating with the UE or a specific cell group including a serving eNB of the UE with communication/channel state values (e.g., RSRPs/RSRQs) of eNBs included in another cell group having a different virtual cell ID from that of the specific cell group. In this case, the UE may be configured to perform an RRM reporting operation only when the communication/channel state value of an eNB included in the other cell group exceeds or is equal to or larger than the representative communication/channel state value of the specific cell group. Or only if the communication/channel state value of an eNB included in the other cell group is larger than the representative communication/channel state value of the specific cell group by a predetermined threshold or more, the UE may be configured to perform an RRM reporting operation. Or only if the communication/channel state value of an eNB included in the other cell group exceeds or is equal to or larger than a predetermined threshold, the UE may be configured to perform an RRM reporting operation.

Or the UE may be configured to determine whether to perform an RRM reporting to the serving eNB using a representative value indicating a communication/channel state on a group basis. It is assumed that the UE compares the representative communication/channel state value of the specific cell group currently communicating with the UE or the specific cell group including the serving eNB of the UE with a representative communication/channel state value of another cell group having a different virtual cell ID. Only if the representative communication/channel state value of the other cell group exceeds or is equal to or larger than the representative communication/channel state value of the specific cell group, or only if the representative communication/channel state value of the other cell group is larger than the representative communication/channel state value of the specific cell group by a predetermined threshold or more, the UE may be configured to perform an RRM reporting operation.

Further, if the UE performs an RRM reporting operation according to the above embodiment, the UE may also transmit information (e.g., a physical cell ID) about an eNB having the highest communication/channel state value among eNBs included in the other cell group.

eNBs about which the UE performs an RRM reporting may be limited to eNBs included in the specific cell group currently communicating with the UE or the specific cell group including the serving eNB of the UE, or eNBs included in other cell groups having different virtual cell IDs. On the contrary, the eNBs about which the UE performs an RRM reporting may be limited to eNBs that do not belong to the specific cell group currently communicating with the UE or the specific cell group including the serving eNB of the UE.

Further, if a specific UE conducts communication within the area of a specific cell group having a common virtual cell ID, a serving eNB may indicate non-RRM reporting about eNBs included in the cell group area or non-RRM reporting for handover between eNBs included in the cell group area to the UE by a predefined higher layer signal or physical layer signal.

In another method, the UE may be configured to perform an RRM reporting operation for each eNB having a different physical cell ID in regard to eNBs included in the specific cell group currently communicating with the UE or the specific cell group including the serving eNB of the UE. For example, the UE may perform an RRM reporting operation for each of a plurality of eNBs having different physical cell IDs for the purpose of determining whether the communication/channel state between a specific eNB and the UE is changed by a predetermined level or threshold or higher, not for the purpose of handover. The RRM reporting operation for each of the eNBs included in the specific cell group may be performed based on a predefined RS (e.g., CRS). For this purpose, the UE may be configured to perform an RRM reporting operation for each eNB, while considering all of the eNBs of the specific cell group to be serving eNBs.

For example, upon receipt of the information, eNBs may select an eNB or a set of eNBs capable of cooperative communication, which offers the best communication/channel state (e.g., RSRPs/RSRQs) to the specific UE by exchanging signals between the eNBs on predefined radio channels or via X2 interfaces. The UE may perform UL/DL control/data information transmission and reception (e.g., UL/DL control/data information transmission and reception using a virtual cell ID-based EPDCCH) or power control through the selected eNB or eNB set.

In the case where a specific eNB or eNB set is selected in this manner, the afore-described CRS-based measurement/reporting operation (e.g., a CRS-based RRM measurement/reporting operation) is more accurate than a general CRS-based measurement/reporting operation. Accordingly, the afore-described CRS-based measurement/reporting operation is preferable in terms of management of a cooperative communication measurement set (i.e., a CoMP measurement set).

Further, according to the present invention, the UE may be configured to report CRS-based measurement information to the serving eNB by performing a CRS-based measurement operation on eNBs having different physical cell IDs included in the specific cell group currently communicating with the UE or the specific cell group to which the serving eNB of the UE belongs. For example, the UE may be configured to report measurement information for a usage other than handover by performing a CSI-RS-based RSRP measurement operation.

Different CSI-RS configurations (e.g., CSI-RS transmission resource areas or CSI-RS transmission antenna ports) may be defined for the eNBs included in the specific cell. Or the same CSI-RS configuration may be defined for some of the eNBs, whereas different CSI-RS configurations may be defined for the other eNBs. The UE may receive the CSI-RS configurations of the eNBs included in the specific cell group or CSI-RS-based measurement information from the serving eNB by a predefined higher layer signal or physical layer signal.

Therefore, if the UE is configured to perform a CSI-RS-based measurement operation on eNBs belonging to a specific cell group, the UE does not need to perform an RRM reporting operation on each of eNBs having different physical cell IDs among the eNBs of the specific cell group, thus reducing signal overhead of the RRM reporting operation.

Likewise, upon receipt of CSI-RS-based measurement values, the serving eNB may determine an eNB offering the best communication/channel state to the specific UE or an eNB set capable of cooperative communication by exchanging signals between eNBs on predefined radio channels or via X2 interfaces.

The UE may perform UL/DL control/data information transmission and reception (e.g., UL/DL control/data information transmission and reception using a virtual cell ID-based EPDCCH) or power control with the specific eNB or eNB set determined by the serving eNB.

Further, the UE may perform UL/DL control/data information transmission using a virtual cell ID-based EPDCCH transmitted from at least one specific eNB of a cell group for which a common virtual cell ID is assumed in an environment to which the embodiments of the present invention are applied. The specific eNB that performs the UL/DL control/data information transmission in the group (for which the virtual cell ID is assumed) is selected through cooperation between eNBs based on CSI (e.g., CQI/PMI/RI) of each of eNBs having different physical cell IDs, of which predefined RSs (e.g., CSI-RSs or CRSs) are measured and reported by the UE.

According to the foregoing embodiment of the present invention, if a UE performs an RRM/RLM operation, the UE may avoid frequent handover, RRM reporting, or RLF declaration operations in an environment in which a plurality of eNBs having relatively small communication coverage (e.g., micro cells) are deployed in the area of an eNB having large communication coverage (e.g., a macro cell).

The above-described embodiments of the present invention may be considered to be methods for simultaneously performing communication operations of CoMP scenario 3 (for an L-UE or an A-UE) and CoMP scenario #4 (for an L-UE) in the above communication environment.

Further, the above-described embodiments of the present invention may be extended to cell reestablishment or cell reselection of a UE in idle mode, if the UE is capable of performing an initial access operation on an EPDCCH.

That is, the UE may be configured to perform a related operation for cell reselection in the idle mode based on predefined representative communication/channel state values (e.g. RSRP/RSRQ values) of cell groups to which a common cell ID is assigned. For example, after the cell reselection operation, the UE may perform an initial access operation using a virtual cell ID-based EPDCCH. In another example, an eNB that transmits system information (e.g., (E-)SIB or (M-)MIB) in a cell group to which a virtual cell ID is assigned may define an eNB of a specific cell group, to which a UE is to perform an initial access operation using a virtual cell ID-based EPDCCH, or may designate an eNB of a specific cell group, which offers the best communication/channel state (e.g., RSRP/RSRQ) to the UE, to play the same role.

Further, it may be regulated that different RRM operations are performed according to UE modes (e.g., idle mode or connected mode). For example, if a UE performs cell reselection in the idle mode, the UE may perform a legacy physical cell ID-based RRM operation not on a virtual cell ID-based cell group basis. If the UE is placed in the connected mode, the UE may perform an RRM or RLM operation on a virtual cell ID-based cell group basis.

According to the present invention, if a specific UE conducts communication through a serving eNB belonging to a specific cell group, the specific UE may be configured to perform individual RLM measurement operations for (the serving eNB and) eNBs having different physical cell IDs in the specific cell group, for an RLM operation and may derive a representative value (RLM value) indicating the communication/channel state of the specific cell group according to a predefined setting. However, the UE may be configured to make a final RLF decision as to the specific cell group, taking into account at least one of "the RLM measurement value of the serving eNB of the UE" and "the representative RLM value of the cell group". For example, if the RLM measurement value of the serving eNB satisfies a predefined RLF declaration condition, the representative RLM measurement value of the cell group satisfies the predefined RLM declaration condition, or both of the RLM measurement value of the serving eNB and the representative RLM measurement value of the cell group satisfy the predefined RLM declaration condition, the UE may declare RLF for the cell group.

That is, even though the representative RLM measurement value of the specific cell group does not satisfy the predefined RLM declaration condition, if the RLM measurement value of the serving eNB satisfies the RLN declaration condition, the UE may finally declare RLF for the cell group. Further, while the above description has been given in the context of an RLM operation of a UE, it can be extended to an RRM operation of the UE.

According to the present invention, to allow a UE to transmit UL control/data information within a specific cell group based on a common virtual cell ID, a Timing Advance (TA) value may be defined or adjusted for a specific eNB of the cell group. The specific eNB of the specific cell group, to which a TA value is applied for UL control/data information transmission of the UE, may be selected in a predefined rule. For example, the specific eNB may be interpreted as a representative eNB. Further, the specific eNB may be defined as a serving eNB of the UE, an eNB having the smallest path loss, an eNB having the smallest TA value, or an eNB having the largest RRM measurement value (e.g., RSRP or RSRQ). On the contrary, the specific eNB may be defined as the serving eNB of the UE, an eNB having the largest path loss, an eNB having the largest TA value, or an eNB having the smallest RRM measurement value (e.g., RSRP or RSRQ). Further, an eNB may indicate whether to apply this rule and/or information about the setting to the UE by a predefined higher layer signal or physical layer signal.

For example, for application of a TA value for UL control/data transmission of a UE, an eNB may be predefined from a specific cell group, or an eNB offering the best communication/channel state (e.g., RSRP/RSRQ) to the UE or an eNB offering the highest reception strength of a predefined RS (e.g., CRS or CSI-RS) to the UE may be selected from the specific cell group.

Or a representative TA value for UL control/data communication of a specific cell group may be defined based on an average or weighted average of TA values between a specific UE and eNBs having different physical cell IDs in the specific cell group. To calculate the weighted average, a weight for each cell may be determined using ratios of the communication/channel state values (e.g., RSRP/RSRQ values) between the UE and the eNBs having different physical cell IDs in the specific cell group.

Additionally in the present invention, RLF is declared for a communication link between the UE and the serving eNB belonging to the specific cell group because the communication/channel state between the serving eNB and the UE gets poor due to various factors. However, if a predefined representative communication/channel state value of the specific cell group does not satisfy an RLF declaration condition, the UE may be configured to indicate whether RLF has been declared between the UE and the serving eNB to other eNBs of the cell group in a predefined UL radio resource area (e.g., a PUCCH/PUSCH).

Accordingly, upon receipt of the information indicating whether RLF has been declared between the UE and the serving eNB in the UL radio resource area, the eNBs may select an eNB that will transmit system information (e.g., an SIB, a PBCH, or an MIB) to the UE after the corresponding time point through cooperation between the eNBs. The selected eNB may indicate related information (e.g., information indicating selection of the eNB as an eNB to transmit system information to the UE) to the UE by a predefined higher layer signal or physical layer signal, or may operate transparently to the UE without direct signaling of the information. For example, an eNB having the smallest path loss from the UE, other than the serving eNB, or an eNB having the largest RRM measurement value (e.g., RSRP/RSRQ) from the UE, other than the serving eNB may be reselected as an eNB to transmit system information.

Because examples (or embodiments) of the foregoing proposed method can be included as one of methods for implementing the present invention, it is apparent that they may be regarded as proposed methods.

The above-described embodiments of the present invention are applicable to an environment in which a predefined RS-(e.g., DM-RS-)based E-SIB or E-PBCH (e.g., an E-MIB) transmission operation other than a legacy CRS-based SIB or PBCH (e.g., an MIB) transmission operation is performed.

Further, the above-described embodiments of the present invention can be extended even to a case in which a UE performs an RRM/RLM operation in idle mode or connected mode.

Further, the above-described embodiments of the present invention can be extended to a case in which an RLF declaration operation is performed based on decoding performance of newly defined channels (e.g., a newly defined EPDCCH-based RLM measurement value (e.g., a BLER of joint decoding of a (DM-RS-based) EPDCCH and EPCFICH) or combined decoding performance of an EPDCCH and a PDCCH), as well as a case in which an RLF declaration operation is performed based on a BLER of joint decoding of a legacy (CRS-based) PDCCH and PCFICH.

Further, the embodiments of the present invention can be extended to a case in which a UE communicates simultaneously with a Primary Cell (PCell)-based eNB (i.e., a primary eNB) and a Secondary Cell (SCell)-based eNB (i.e., a secondary eNB) in an environment adopting Carrier Aggregation (CA).

Figure 14:
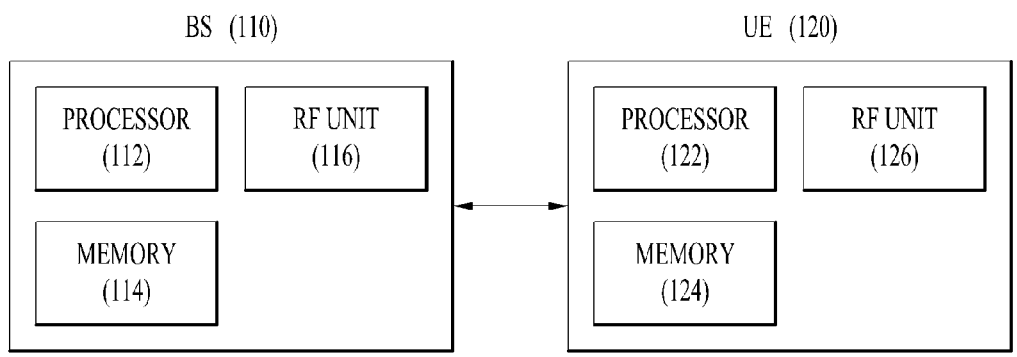
FIG. 14 is a block diagram of a Base Station (BS) and a UE which are applicable to an embodiment of the present invention.

FIG. 14 is a block diagram of a BS and a UE that are applicable to an embodiment of the present invention.

If a wireless communication system includes relays, backhaul link communication is performed between a BS and a relay and access link communication is performed between a relay and a UE. Accordingly, the BS or the UE illustrated in FIG. 14 may be replaced with a relay under circumstances.

Referring to FIG. 14, the wireless communication system includes a BS 110 and a UE 120. The BS 110 includes a processor 112, a memory 114, and a Radio Frequency (RF) unit 116. The processor 112 may be configured to perform procedures and/or methods proposed by the present invention. The memory 114 is connected to the processor 112 and stores various types of information related to operations of the processor 112. The RF unit 116 is connected to the processor 112 and transmits and/or receives radio signals. The UE includes a processor 122, a memory 124, and an RF unit 126. The processor 122 may be configured to perform procedures and/or methods proposed by the present invention. The memory 124 is connected to the processor 122 and stores various types of information related to operations of the processor 122. The RF unit 126 is connected to the processor 122 and transmits and/or receives radio signals. The BS 110 and/or the UE 120 may have a single antenna or multiple antennas.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by a subsequent amendment after the application is filed.

In the present disclosure, a specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor.

The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method and apparatus for performing a measurement by a UE in a wireless communication system have been described in the context of a 3GPP LTE system, they are applicable to many other wireless access systems than the 3GPP LTE system.

The invention claimed is:

1. A method for performing a measurement by a User Equipment (UE) in a wireless communication system, the method comprising:
receiving information about a specific cell group to be measured,
wherein the received information includes at least one of a list of physical cell identifiers (IDs) of a plurality of cells included in the specific cell group and a virtual cell ID for the specific cell group;
determining a representative value by measuring the specific cell group according to the received information; and
when the received information includes the virtual cell ID, performing Radio Resource Management (RRM) or Radio Link Monitoring (RLM) based on the representative value,
wherein the RRM is set to be performed based on a measurement result of the specific cell group being larger than a measurement result of a cell group having a cell ID different than the virtual cell ID.

2. The method according to claim 1, wherein the representative value is determined according to communication state indication values measured from the plurality of cells.

3. The method according to claim 2, wherein each of the communication state indication values is one of a Reference Signal Received Power (RSRP), a Reference Signal Received Quality (RSRQ), a Block Error Rate (BLER) of joint decoding of a Physical Downlink Control Channel (PDCCH) and a Physical Control Format Indicator Channel (PCFICH), an Enhanced PDCCH (EPDCCH)-based RLM measurement value, and a BLER based on decoding performance of an EPDCCH and a PDCCH.

4. The method according to claim 1, wherein the measurement is performed using at least one Reference Signal (RS) transmitted at a same time point by the plurality of cells included in the specific cell group.

5. The method according to claim 1, wherein the measurement is performed based on a Reference Signal (RS) transmission resource area or an RS transmission antenna port, independently configured for each of the plurality of cells included in the specific cell group.

6. The method according to claim 1, wherein the RLM is set to be performed based on an Enhanced Physical Downlink Control Channel (EPDCCH).

7. The method according to claim 1, wherein the RRM is reported only about the cell group having the cell ID different than the virtual cell ID.

8. The method according to claim 1, wherein the RRM is set to be reported about each of the plurality of cells of the specific cell group.

9. The method according to claim 1, further comprising attempting initial access based on an Enhanced Physical Downlink Control Channel (EPDCCH).

10. The method according to claim 9, wherein if the UE is in connected mode, the RRM is performed for the plurality of cells to which a same virtual cell ID is assigned.

11. The method according to claim 1, wherein the RLM is set to be performed based on at least one of an RLM measurement value of a serving base station (BS) of the UE and the representative value.

12. The method according to claim 1, wherein a Timing Advance (TA) value is set for the UE with respect to a specific cell included in the specific cell group.

13. A User Equipment (UE) for performing a measurement in a wireless communication system, the UE comprising:
a Radio Frequency (RF) unit; and
a processor,
wherein the processor is configured to:
receive, via the RF unit, information about a specific cell group to be measured,
wherein the received information includes at least one of a list of physical cell identifiers (IDs) of a plurality of cells included in the specific cell group and a virtual cell ID for the specific cell group, determine a representative value by measuring the specific cell group according to the received information, and when the received information includes the virtual cell ID, perform Radio Resource Management (RRM) or Radio Link Monitoring (RLM) based on the representative value, wherein the RRM is set to be performed based on a measurement result of the specific cell group being larger than a measurement result of a cell group having a cell ID different than the virtual cell ID.

* * * * *